US011556628B2

(12) United States Patent
Marzorati et al.

(10) Patent No.: US 11,556,628 B2
(45) Date of Patent: Jan. 17, 2023

(54) MULTIDIMENSIONAL ATTRIBUTE AUTHENTICATION

(71) Applicant: International Business Machines Corporation, Armonk, NY (US)

(72) Inventors: Mauro Marzorati, Lutz, FL (US); Jana H. Jenkins, Raleigh, NC (US); Leanna Holmquist, Cedar Park, TX (US); Rosa M. Bolger, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 486 days.

(21) Appl. No.: 16/398,441

(22) Filed: Apr. 30, 2019

(65) Prior Publication Data
US 2020/0349250 A1 Nov. 5, 2020

(51) Int. Cl.
*G06F 21/36* (2013.01)
*H04L 9/32* (2006.01)
(Continued)

(52) U.S. Cl.
CPC .............. *G06F 21/36* (2013.01); *G06F 21/31* (2013.01); *H04L 9/3226* (2013.01);
(Continued)

(58) Field of Classification Search
CPC .. G06F 21/36; G06F 2221/2103; G06F 21/31; H04L 9/3226; H04L 63/083; H04W 12/06
See application file for complete search history.

(56) References Cited

U.S. PATENT DOCUMENTS

| 8,347,103 B2* | 1/2013 | Jones | H04L 9/3226 726/19 |
| 8,756,672 B1* | 6/2014 | Allen | G06F 21/36 726/19 |

(Continued)

FOREIGN PATENT DOCUMENTS

| EP | 2254071 A1 | 11/2010 |
| JP | 2015534658 A5 | 9/2016 |
| KR | 20150060674 A | 6/2015 |

OTHER PUBLICATIONS

Saiful Azad, VAP code: A secure graphical password for smart devices, Computers & Electrical Engineering, vol. 59, 2017, pp. 99-109, ISSN 0045-7906, https://doi.org/10.1016/j.compeleceng.2016.12.007. (https://www.sciencedirect.com/science/article/pii/S0045790616310242) (Year: 2017).*

(Continued)

*Primary Examiner* — Jennifer E Nichols
(74) *Attorney, Agent, or Firm* — David K. Mattheis; Maeve M. Carpenter (57) ABSTRACT

A user requesting authentication is presented a keypad that includes multiple keys and respective keys include a character that is associated with a shape. Responsive to selection of a key, a first set of attributes is activated for selection. Responsive to determining a selection of an attribute from the first set of attributes, activating one or more additional sets of attributes associated with the first key. Responsive to determining a selection from the one or more additional sets of attributes, determining whether a selection of an additional key is made. Responsive to determining the selection of the additional key, activating for selection a first set of attributes and one or more additional sets of attributes of the additional key, and responsive to determining selections of keys and corresponding attributes associated with the selec- (Continued)

tion of respective keys, determining the validity of the authentication code.

19 Claims, 3 Drawing Sheets

(51) Int. Cl.
  *H04W 12/06* (2021.01)
  *H04L 9/40* (2022.01)
  *G06F 21/31* (2013.01)

(52) U.S. Cl.
  CPC ........... *H04L 63/083* (2013.01); *H04W 12/06* (2013.01); *G06F 2221/2103* (2013.01)

(56) References Cited

U.S. PATENT DOCUMENTS

| | | | | |
|---|---|---|---|---|
| 8,826,028 | B1* | 9/2014 | Boyington | G06F 21/606 713/182 |
| 9,552,465 | B2 | 1/2017 | Pike | |
| 9,724,042 | B1* | 8/2017 | Lodato | H02S 50/00 |
| 10,440,007 | B1* | 10/2019 | Ramalingam | G06F 3/0484 |
| 2004/0139331 | A1 | 7/2004 | Sanai | |
| 2008/0034428 | A1* | 2/2008 | Bejar | H04L 63/126 726/23 |
| 2008/0209526 | A1* | 8/2008 | Varghese | H04L 9/32 726/5 |
| 2008/0235788 | A1* | 9/2008 | El Saddik | G06F 21/36 726/18 |
| 2008/0290985 | A1* | 11/2008 | Vogedes | G06F 1/3215 340/3.1 |
| 2009/0083847 | A1* | 3/2009 | Fadell | G06F 3/0488 726/16 |
| 2009/0254954 | A1 | 10/2009 | Jeong | |
| 2010/0218249 | A1* | 8/2010 | Wilson | H04W 12/068 726/19 |
| 2010/0319057 | A1* | 12/2010 | Murai | H04L 63/08 726/5 |
| 2013/0023240 | A1* | 1/2013 | Weiner | G06Q 20/4015 455/411 |
| 2013/0291096 | A1* | 10/2013 | Finnan | G06F 21/36 726/19 |
| 2014/0018038 | A1* | 1/2014 | Bell | G06F 21/36 455/411 |
| 2014/0020087 | A1* | 1/2014 | Ooi | G06F 21/36 726/19 |
| 2014/0118267 | A1* | 5/2014 | Thomas | G06F 21/316 345/173 |
| 2014/0157424 | A1* | 6/2014 | Lee | G06F 21/60 726/26 |
| 2014/0317724 | A1* | 10/2014 | Hicks | G06F 21/36 726/19 |
| 2015/0045000 | A1* | 2/2015 | Kim | G06F 3/0488 455/411 |
| 2015/0121493 | A1* | 4/2015 | Chen | H04L 63/168 726/6 |
| 2015/0235018 | A1* | 8/2015 | Gupta | G06F 21/36 726/19 |
| 2015/0319153 | A1* | 11/2015 | Tartz | H04L 63/08 726/4 |
| 2015/0355776 | A1* | 12/2015 | Govindarajeswaran | G06F 21/36 345/173 |
| 2016/0182502 | A1* | 6/2016 | Smith | H04L 63/0884 726/7 |
| 2016/0283013 | A1* | 9/2016 | Engstrom | G06F 3/0412 |
| 2016/0283710 | A1* | 9/2016 | Kwon | G06F 3/04886 |
| 2017/0034158 | A1* | 2/2017 | Ekambaram | H04W 12/33 |
| 2017/0140169 | A1* | 5/2017 | Boger | G06F 3/04886 |
| 2017/0329953 | A1* | 11/2017 | Defazio | G06F 21/31 |
| 2018/0089404 | A1* | 3/2018 | Uchida | G06F 3/0488 |
| 2018/0253176 | A1* | 9/2018 | Hajimusa | G06F 21/31 |
| 2019/0050545 | A1* | 2/2019 | Keret | G10L 17/24 |
| 2019/0172468 | A1* | 6/2019 | Jain | G10L 15/22 |
| 2019/0213306 | A1* | 7/2019 | Caselles | G06F 21/32 |
| 2019/0236258 | A1* | 8/2019 | Mooney | G06F 3/0482 |
| 2020/0228641 | A1* | 7/2020 | Chen | G06F 9/451 |
| 2020/0356264 | A1* | 11/2020 | Cutler | G06F 21/31 |
| 2021/0303737 | A1* | 9/2021 | Choudhari | G06F 3/0238 |

OTHER PUBLICATIONS

"10 Best Password Managers of 2019", Feb. 9, 2019, consumersadvocate.org, 4 pps., https://www.consumersadvocate.org/password-manager/a/best-password-manager?&pd=true&keyword=password&gca_campaignid=958851270&gca_adgroupid=50782975143&gca_matchtype=p&gca_network=g&gca_device=c&gca_adposition=1o1&gca_loc_interest_ms=&gca_loc_physical_ms=9009718&gclid=EAlalQobChMI3K2y8ZG53AIVA4ppCh12Ng9CEAMYASAAEgJCWPD_BwE.

"6 Ways to Unlock Pattern Lock on Android Easily", dr.fone, Copyright © 2019 Wondershare, printed from the Internet on Feb. 12, 2019, 18 pps., https://drfone.wondershare.com/unlock/pattern-lock.htm.

"Use a passcode with your iPhone, iPad, or iPod touch", Sep. 17, 2018, Copyright © 2019 Apple Inc., 4 pps., https://support.apple.com/en-us/HT204060.

Dunn, "Could semantic icons replace passwords and PINs?", Jul. 18, 2018, Mobile, Privacy, Security threats, 15 pps., https://nakedsecurity.sophos.com/2018/07/18/could-semantic-icons-replace-passwords-and-pins/.

Spector, "Windows 10 picture password: Draw your own conclusions about its safety", Mar. 14, 2016, PC World from IDG, 6 pps., https://www.pcworld.com/article/3035032/windows/windows-10-picture-password-draw-your-own-conclusions-about-its-safety.html.

\* cited by examiner

MULTIDIMENSIONAL ATTRIBUTE AUTHENTICATION

FIELD OF THE INVENTION

The present invention relates generally to the field of authentication, and more particularly to utilizing multidimensional keypads for authentication verification.

BACKGROUND OF THE INVENTION

The use of passcodes and personal identification numbers (PINs) as authentication of access to personal devices, accounts, and services is intended to offer security. In some cases, authentication methods include use of multiple devices, longer character strings, or variations of upper case, lower case, numeric, and special character requirements to improve security. Advancement in efforts to improve security are on-going, keeping pace with advancement of technological capabilities.

SUMMARY

Embodiments of the present invention disclose a method, computer program product, and system for generating an authentication code. The method for generating an authentication code provides for one or more processors to activate a keypad to a user requesting entry of an authentication code, such that the keypad includes multiple keys and respective keys include a character from a set of characters, the respective character of the respective key associated with a shape of a set of shapes. The one or more processors, responsive to selection of a first key from the keypad, activating a first set of attributes for selection, associated with the first key. The one or more processors, responsive to determining a selection of an attribute from the first set of attributes, activating one or more additional sets of attributes associated with the first key. The one or more processors, responsive to the one or more processors, determining a selection from the one or more additional sets of attributes, determining whether a selection of an additional key from the keypad is made. The one or more processors, responsive to determining the selection of the additional key from the keypad is made, activating for selection a first set of attributes associated with the additional key, and subsequently activating for selection one or more additional sets of attributes associated with the additional key, and one or more processors, responsive to determining selections of keys from the keypad and corresponding selection of a first set of attributes, and one or more additional sets of attributes associated with selection of respective keys, determining the validity of the authentication code.

DETAILED DESCRIPTION

Embodiments of the present invention recognize that techniques to provide secure authentication competes with efforts to undermine and overcome the authentication techniques. Use of a personal identification number (PIN) is often used for use of mobile devices, automated teller machines (ATMs), entry locks, as well as other applications. Users may develop ways to protect PINs from observation or detection by others, and employ approaches to make PINs more easily remembered, however, others with malevolent intent continually pursue ways to 'work-around' or break PINs and circumvent authorization protections.

Embodiments of the present invention provide a method, computer program product, and computer system for providing multidimensional attributes to keys of a keypad for selection as input to an access or authentication challenge. The various multidimensional attributes of the keys may or may not be used by a user as part of an access code or authentication code, hereafter referred to as the authentication or authentication code. In some embodiments the multidimensional attributes may include a combination of visually observable attributes, such as color, shape, character, and position; and non-visually observable attributes, such as temporal, auditory, and haptic. The combination of some or all dimensions in a valid authentication challenge response increases the complexity and includes attributes that reduce the observability, detection, and unintended disclosure of authentication entry. In some embodiments, the use of multidimensional attributes associated with keys of a keypad, support decoy features to further thwart detection efforts.

In some embodiments of the present invention, a soft-keypad is used, presenting and activating multiple key images on a touch-sensitive display screen, and including alpha-numeric and/or special characters encompassed within various shapes (as part of the images) associated with the keys. In some embodiments, an image including multiple colors/patterns is activated and presented for selection, and portions of the touch-sensitive display screen include vibration generating capability for haptic signal detection. In some embodiments, an audio speaker and microphone are included, enabling recognition of sound and confirmation use of voice recognition. In yet other embodiments, image and/or video display may be included for confirmation of a particular image or video as part of authentication. The keypad may include backlighting, offering an additional visual confirmation of the absence or presence of backlighting as part of an authentication sequence.

Embodiments of the present invention recognize that although a soft-keypad may offer greater flexibility and practicality of implementation, those skilled in the art will recognize that a hardware-based solution (with enabling software) may similarly provide for multidimensional attribute authentication without departing from the scope of the invention as recited by the claims. For example, a hardware-based keypad outfitted with multiple keys having associated characters in combination with shapes may be activated in response to an indication of an authentication request. The keypad includes companion hardware enabling selection of a color/pattern, sensing of haptic signals, visual and audio presentation, and a microphone for voice recognition. The hardware-based solution, along with software to receive, process and confirm input, also provides for multidimensional attribute authentication, similar to the use of the soft-keypad approach. For brevity, the case of a soft-keypad will be used for illustrative and example purposes, and "presentation" of images on a touch-sensitive display screen indicates the activation of the hardware counterpart embodiments.

In an exemplary embodiment of the present invention, a user initiates an authentication request and is presented with an authentication challenge, to which the user provides a response that includes selection from a keypad, with multiple attributes associated with a key of the keypad. The user selection is made with a finger, a stylus or pointing device with at least one selection button. The user selects or omits attributes that comprise a sequence of response selections as an authentication code, identifying the user. A display presents the user with an image of an activated keypad with multiple keys. Each of the keys includes or is associated with a shape, and a character of a set of alpha-numeric and special characters. The user selects a key and shape combination, and is presented with a color selection image, (in the case of a hardware solution, the color selection device is activated for input). The user selects a color and while holding a finger on the selected color, the display presents a series of haptic and auditory signals. In some embodiments, the user removes the finger in contact with the color selector upon sensing the appropriate combination of haptic and auditory signals associated with the user's authentication. In other embodiments, the user vocally responds upon hearing and sensing the appropriate combination of auditory and haptic signals. In yet other embodiments the auditory portion of the combination may be a phrase that the user repeats, matching voice recognition and the temporal attribute corresponding to presenting the matching haptic and auditory combination to the user.

In some embodiments of the present invention, subsequent to a response to the haptic and auditory combination, the user is presented with one or more additional attributes activated for selections, such as the user observing the keypad alternating between backlighting or dark conditions, and the user touches, or selects with a pointing device, the keypad when the appropriate authorization corresponding condition is displayed. In other embodiments, the backlighting or dark condition of the keypad is combined with a haptic vibration, providing additional selection choices for the user. The user touches or selects the keypad at the appropriate backlit or dark condition, and removes the touch or selection indication upon the appropriate haptic condition (present or absent). The user then is presented with the activated keypad for selecting a second key (as appropriate for the user's authentication) and proceeds similarly as described above. In some embodiments, All attributes are recorded for each keypad key selection, but not all attributes may contribute to the correct resolution of the authentication code of the user.

In some embodiments of the present invention an attribute may be omitted. For example, a user having an authorization code of "Square—Blue—Dog Bark—Backlit Keypad" selects a key of the keypad that includes the square shape. The keypad may include multiple keys that have the square shape, each with a different character associated with the respective key. The user need only select one of the keys with the square shape. The user selects and maintains contact with the selection of blue color and removes contact when the dog bark auditory signal is heard, and then touches the keypad when the keypad is displayed as backlit. In some embodiments of the present invention, user selections of the multi-dimensional attributes of an authentication code are made by the user's finger making contact with the selection surface, and contact may be maintained by sliding of the user's finger to another selection image. In other embodiments, the user's selection may be made by use of a stylus or similar object, or selections may be made by use of a pointing device configured with a selection button that may remain depressed between selections to reflect continuous contact with a selection surface, and configured to produce haptic signals.

In embodiments of the present invention, keys of the keypad include a character, such as an alpha-numeric or special character. Each key includes a shape along with the character, and individual characters and individual shapes may be represented multiple times on the keypad. For example, a particular keypad may include twelve keys, each with a number in combination with a shape. The numbers 3 and 8 may be repeated twice, but one key with the number 3 may include a circle shape, whereas the other key with the number 3 may include a diamond shape. Similarly, the two instances of the number 8 may include one with a square shape and the other with a hexagon shape. In some embodiments, selection of a key and shape combination initiates a color selection image, such as a color wheel or table. The color is selected with a touch of an appropriate section of the image corresponding to the intended color. The section of the image may include a color, a text label of the color, or both. In other embodiments, the image includes various patterns for selection, such as horizontal lines, vertical lines, checkered pattern, diagonal left to right, diagonal right to left, or other visually recognizable patterns. In some embodiments a selection of a combination of color and pattern are made. In some embodiments, the exclusion of selecting a color or pattern may be input by sliding a touch from the selected key-shape combination on the keypad to a designated portion of the display other than the color or pattern selection images, such as a position adjacent to the color or pattern selection image. The touch of the designated position adjacent to the color pattern registers omission of a color/pattern selection and initiates the haptic-auditory signal combinations.

In some embodiments of the present invention, the user maintains contact with the color/pattern selection image, or contact at the designated position omitting a color selection, and receives the combination of haptic and auditory signals. The haptic signals may be binary, such as the absence or presence of vibration, or may include pulses of more than one vibration. The haptic signal is presented in combination with an auditory signal, which may be a recognizable sound such as the horn sound of a car, the bark of a dog, or cheering of a crowd. The haptic and auditory signals are presented in a sequence of combinations, and the user removes touch contact from the color selector (or color omitting position) upon recognizing the appropriate combination. In some embodiments, the user maintains continual contact with the touch-sensitive display, sliding contact from the keypad to the color/pattern selector, and releasing contact when the appropriate combination of haptic and auditory signals are recognized. In other embodiments, the selection of the haptic-auditory signal combination is made by the user vocally indicating the selection, which is received by a microphone and processed by speech or voice recognition.

Embodiments of the present invention may include presentation to the user of multiple sets of attributes and in some embodiments, repetition of presentation of attributes for selection. In some embodiments of the present invention the "touch contact" by a user is achieved by use of a pointing device to navigate to a selection on the display, and selections may be made by depressing a selection button on the pointing device. In some embodiments, the selection button remains depressed to simulate a constant "touch" or "contact" condition with the display. In some embodiments, subsequent to selection of the last key of the user's authentication code sequence, and corresponding attribute selection from one or more sets of attributes and additional attributes, completion of key selection is detected by a temporal delay or may be indicated by user input.

Figure 1:
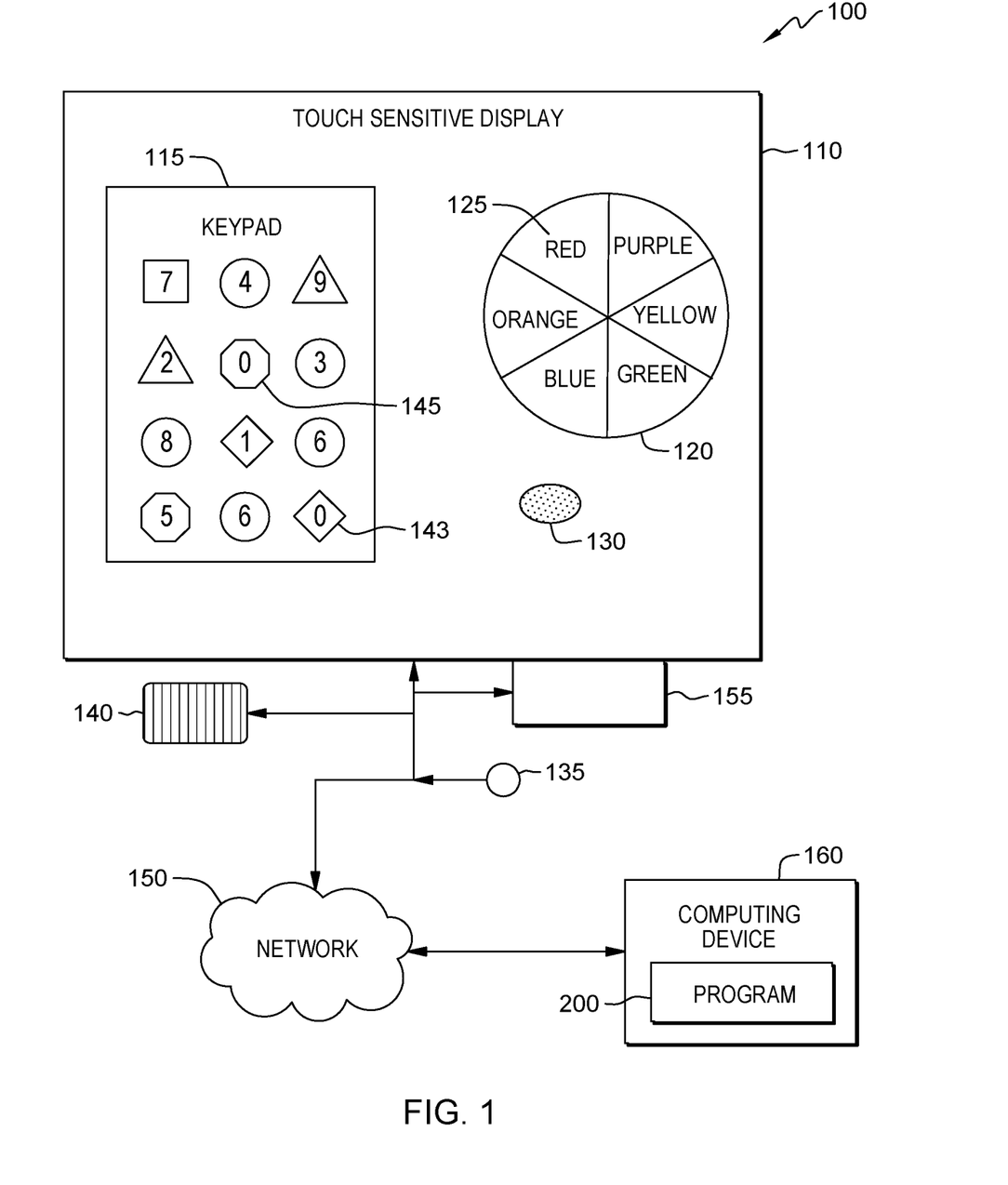
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with an embodiment of the present invention. Distributed data processing environment 100 includes touch-sensitive display 110, keypad 115, color selector 120, alternate touch position 130, microphone 135, speaker 140, haptic source 155, and computing device 160, all connected via network 150.

Network 150 can be, for example, a local area network (LAN), a telecommunications network, a wide area network (WAN), such as the Internet, a virtual local area network (VLAN), or any combination that can include wired, wireless, or optical connections. In general, network 150 can be any combination of connections and protocols that will support communications between touch-sensitive display 110, speaker 140, microphone 135 and computing device 160, in accordance with embodiments of the present invention.

Computing device 160 is depicted as including multi-attribute program 200, operating within distributed data processing environment 100, in accordance with embodiments of the present invention. Computing device 160 can be a standalone computing device, a management server, a web server, a mobile computing device, or any other electronic device or computing system capable of providing receiving, sending, and data processing server functions. In other embodiments, computing device 160 can represent a server computing system utilizing multiple computers as a server system, such as in a cloud computing environment. In another embodiment, computing device 160 can be a laptop computer, a tablet computer, a netbook computer, a personal computer (PC), a desktop computer, a personal digital assistant (PDA), a smart phone, or any other programmable electronic device capable of communicating with touch-sensitive display 110, speaker 140, microphone 135 and haptic signal emitter 155, and other computing devices (not shown) within distributed data processing environment 100, via network 150. In another embodiment, computing device 160 represents a computing system utilizing clustered computers and components (e.g., database server computers, application server computers, etc.) that act as a single pool of seamless resources when accessed within distributed data processing environment 100. Computing device 160 may include internal and external hardware components, as depicted and described in FIG. 4.

Touch-sensitive display 110 includes a surface capable of displaying images, sensing contact with the surface and illuminating portions of the displayable surface. Touch-sensitive display 110 displays images of keypad 115, alternate touch position 130, color selector 120, and may display other images as attributes of a user authentication code. In some embodiments, touch-sensitive display 110 is capable of detecting the touch contact of a user to the surface of touch-sensitive display 110, enabling the determination of selections of keys and attributes presented to the user. In other embodiments, touch-sensitive display 110 may rely on a pointing device operated by the user to make selections of keys and attributes presented as images on touch-sensitive display 110, in which case the detection of touch contact of a user is not required. Touch-sensitive display 110 may include input options (not shown) for the user to indicate completion of selection of keys and attributes associated with each key selection, towards the user's authentication code.

Speaker 140 is a device communicatively connected to computing device 160 via network 150. Speaker 140 delivers auditory signals associated with an authentication code. In some embodiments of the present invention, speaker 140 receives auditory signals from computing device 160 operating multi-attribute program 200, in combination with haptic signals, subsequent to color selection. Speaker 140 presents a series of auditory sounds to a user as part of an authentication code.

Microphone 135 is a device communicatively connected to computing device 160 via network 150. Microphone 135 receives sound input and transmits the input to multi-attribute program 200 operating on computing device 160. Microphone 135 may receive user vocal response indicating selection or recognition of auditory signals presented in combination with haptic signals. Input from microphone 135 is processed with speech recognition associated with multi-attribute program 200 to determine a user selection. In some embodiments, the input from the user is processed by voice recognition techniques, operating in association with multi-attribute program 200, indicating a selection and adding an additional attribute of identification of the user.

Alternate touch position 130 is a portion of touch-sensitive display 110 which is used to maintain touch contact without selecting a color from color selection 120. Subsequent to a user selection of a key having a corresponding character and shape, the user maintains contact with touch-sensitive display 110 sliding the contact to alternate touch position 130 to indicate an omission of a color selection. In FIG. 1, alternate touch position 130 is depicted as an area adjacent to, and outside of color selector 120. In other embodiments, alternate touch position 130 may reside within color selector 120 as a portion maintaining a color consistent with the background of touch-sensitive display 110, and/or labeled with text indicating omission of a color selection. In other embodiments, a user sliding a touch contact to any portion of touch-sensitive display 110 other than keypad 115 or color selector 120 may serve as indicating omission of color selection.

Haptic signal emitter 155 is a device depicted as in-contact with touch-sensitive display 110. Haptic signal emitter 155 is communicatively connected to multi-attribute program 200 operating on computing device 160 and receives communication to produce haptic vibrations to touch-sensitive display 110. In some embodiments of the present invention, haptic signal emitter 155 produces vibration similar to a vibrating alert of a smart phone. In other embodiments, haptic signal emitter 155 may produce a haptic signal different than a vibration, such as a single impact. In some embodiments, haptic signal emitter 155 operates in a binary mode of producing a vibration, or an absence of vibration, in combination with speaker 140 producing a series of auditory sounds. A user selects the appropriate combination of haptic signal and auditory signal corresponding to the user's authentication code. In other embodiments, haptic signal emitter 155 produces pulses of vibration adding additional variation and combinations with auditory signals. In some embodiments, haptic signal emitter 155 presents haptic signals, or absence of haptic signals, in association with backlighting or dark display of keypad 115.

Keypad 115 is depicted as presented on touch-sensitive display 110, and includes multiple characters associated respectively with multiple shapes. Touch sensitive display 110 presents the characters and shapes of keypad 115 as individual keys arranged in a pattern. In some embodiments, characters may be repeated, and may be associated with the same shape, or different shapes. Keypad 115 is an image rendered on touch-sensitive display 110 defining an area of touch-sensitive display 110. Keypad 115 receives touch contact by a user selecting a particular key associated with a character and a shape. Key 143 is a key image of multiple key images that are part of keypad 115, rendered on touch-sensitive display 110. Key 143 includes a zero numeral character and a diamond shape. Key 145 is a key image of multiple key images rendered on keypad 115. Key 145 includes a zero numeral character and an octagon shape.

In various embodiments, a user selects a key image of keypad 115 by making touch contact to the area of touch-sensitive display 110 corresponding to a particular key image, such as key 143's image. Key 143 and key 145 may include an alpha-numeric character, or a special character, such, but not limited to: !, @, #, $, %, A, &, *, (,), +, –, :, ;, ", ', {, }, [,], \, |, <, >, /, ?. Key 143 and key 145 include a recognizable shape, such as, but not limited to a: circle, square, rectangle, triangle, diamond, or octagon. Selection of key 143 may meet a user authentication requirement for "zero" as a character, "diamond" as a shape, both "zero and diamond" as a combination, or "neither zero nor diamond", for omission of a character and shape as part of the authentication code for the user.

In some embodiments of the present invention, key selection of keypad 115, such as key 143 and key 145, may be considered attributes of an object of a user's authentication code, with the authentication code comprising one or more objects. For example, the attributes of an object may include: a character selection or no character, a shape selection or no shape, a color selection or no color, a combination of haptic signal and auditory signal, no haptic signal and a auditory signal, haptic signal and no auditory signal, or neither a haptic signal nor an auditory signal, a backlit keypad or a dark keypad, (with or without haptic signal). In some embodiments of the present invention, a temporal attribute may be included, for example, a minimum waiting period after confirming a combination of haptic signal and auditory signal, and initiating a touch contact to select a combination of backlit or dark keypad, with or without a haptic signal. A user's authentication code may include of one or more objects in a particular sequence. Embodiments of the present invention recognize that the haptic and auditory signals are not visually observable, which adds to the protection of the multi-attribute authentication code of the user.

Color selector 120 is depicted as an image including color representation sections and text descriptive of the represented color. Color selector 120 is depicted as having a circular shape, but in other embodiments of the present invention, color selector 120 may be another shape or a table or listing of colors and text combinations. In yet other embodiments, colors may be substituted or combined with various patterns, such as horizontal lines, vertical lines, dots, checkered, or other patterns that can be visually distinguished. In some embodiments, color selector 120 is presented to an authenticating user subsequent to selection by the user of a key and shape combination of keypad 115. The user selects a key, such as key 143, maintains contact with touch-sensitive display 110, and subsequent to the presentation of the image of color selector 120, the user slides the touch contact to the color section of color selector 120 that corresponds to a color component of the user's authentication code, for example, red color section 125. In the event that the user's authentication code omits a selection of a color, the user may slide the touch contact to alternate touch position 130, indicating an omission of color selection, but enabling detection of haptic signals.

Red color section 125 is illustrated as one color section of a plurality of color sections of color selector 120. Red color section 125 includes a particular color distinguished from the other colors of color selector 120, such as the color red, and includes the text "RED" identifying the color included within red color section 125.

Multi-attribute program 200 is depicted as operating on computing device 160 and communicatively connected to display 110, speaker 140, microphone 135, and haptic signal emitter 155. Multi-attribute program 200 receives input from touch-sensitive display 110 and microphone 135 and provides responses respectively to speaker 140, haptic signal emitter 155, and touch-sensitive display 110, via network 150. In some embodiments of the present invention, multi-attribute program 200 presents keypad 115 as an image on touch-sensitive display 110 subsequent to a user indicating intent to authenticate. Multi-attribute program 200 receives touch contact to a character and shape combination of keypad 115 by a user and stores the input of the character and shape as a sequence towards the user's authentication. Multi-attribute program 200 subsequently presents an image of color selector 120 and receives a touch contact corresponding to a color section of color selector 120 from a user touch maintaining contact with touch-sensitive display 110 and sliding to a color section of color selector 120. In some embodiments, subsequent to selection of a color section of color selector 120, the user maintains contact with the selected color section image on touch-sensitive display 110 and determines an appropriate combination of haptic and auditory signals produced by multi-attribute program 200 through speaker 140 and haptic signal emitter 155.

Having detected the appropriate combination of haptic and auditory signals, the user simultaneously removes the touch contact, and multi-attribute program 200 identifies the previously presented haptic and auditory combination and includes the combination as part of the sequence of the user authentication. In some embodiments, subsequent to identifying the haptic and auditory combination, multi-attribute program 200 initiates backlighting and dark alternating sequences of the keypad, and includes the presence or absence of haptic signals. The user re-establishes a touch contact with the keypad, and sensing the appropriate combination of backlighting or dark keypad, with present or absent haptic signals, removes the touch contact, indicating the selection of the previously presented combination.

In some embodiments of the present invention, multi-attribute program 200 may present the object attributes of an authentication program in alternate sequences and may include alternate combinations. For example, multi-attribute program 200 may present color selector 120 initially along with haptic or no-haptic signals, and subsequently present keypad 115 with auditory signals.

Figure 2:
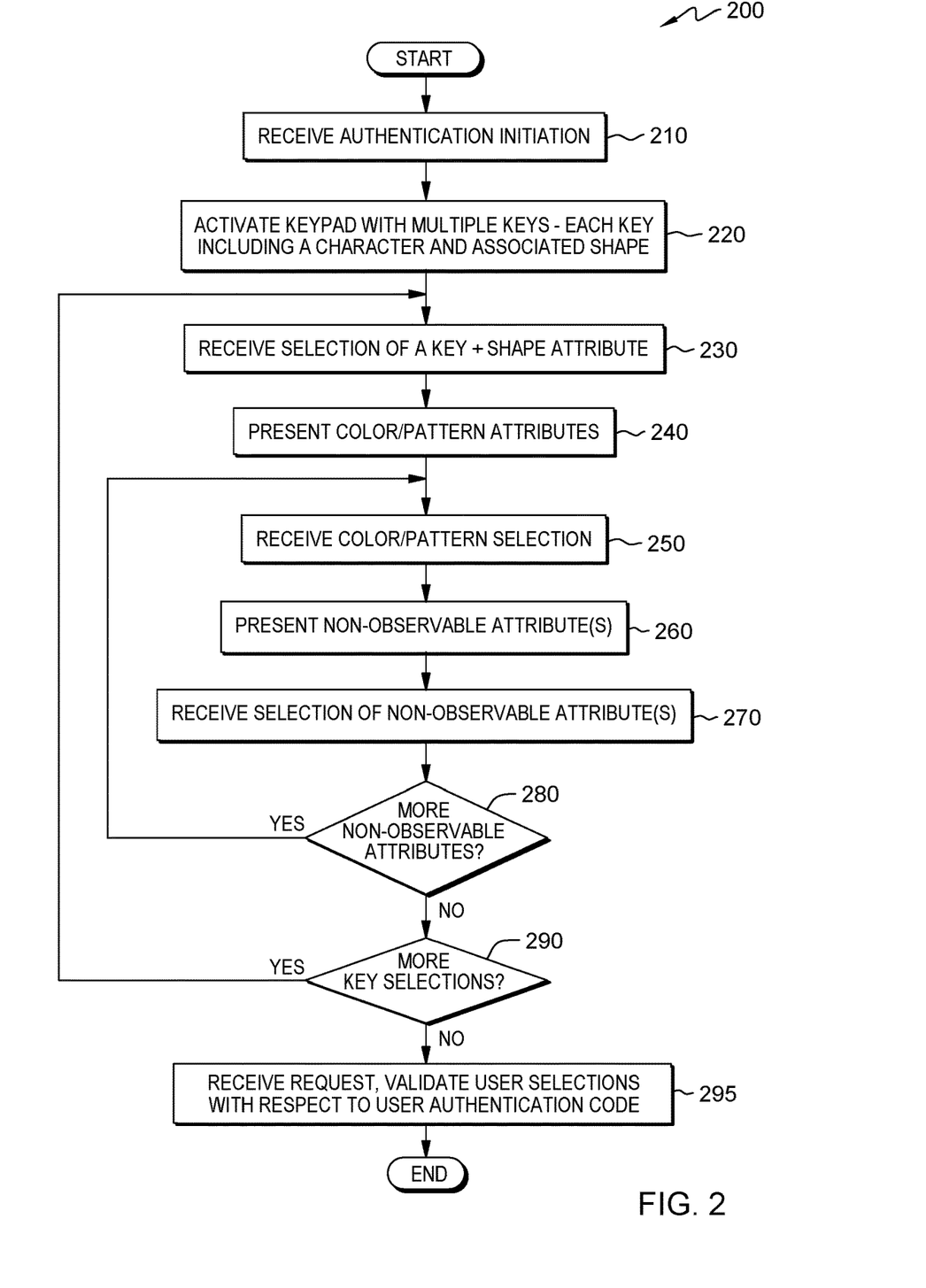
FIG. 2 illustrates operational steps of a multi-attribute program, inserted on a computing device operating within the distributed data processing environment of FIG. 1, in accordance with an embodiment of the present invention.

FIG. 2 illustrates operational steps of multi-attribute program 200, operating on computing device 160, within distributed data processing environment 100 of FIG. 1, in accordance with an embodiment of the present invention. In some embodiments of the present invention, the sequence of performing the activities of multi-attribute program 200 may vary from the sequence represented in FIG. 2. In other embodiments, user selections may indicate no particular selection of an attribute towards fulfilling the user's authentication code. In yet other embodiments, the selection of one or more attribute may include a temporal component, requiring a particular delay or expeditious selection of an attribute. Although the steps illustrated in FIG. 2 represent an embodiment of the present invention, one of average skill in the art will recognize that alternate embodiments of attribute sequence and combination are possible implementations without deviating from the inventive concepts presented herein.

Multi-attribute receives an authentication initiation (step 210). In some embodiments of the present invention, multi-attribute program 200 operates in a "listen" mode for input indicating a request by a user for authentication. In some embodiments the input may be the insertion of a smart card, whereas in other embodiments, the input for initiating user authentication may be depression of a button, vocal request, or another physical activity by the requesting user. For example, a user may insert a smart card into an automated teller machine (ATM) to make a cash withdrawal. Multi-attribute program 200 receives input from the insertion of the smart card of the particular user to begin authentication for the particular user.

Multi-attribute program 200 presents a keypad with multiple keys, each having a character and a shape (step 220). In some embodiments of the present invention, an image of a multi-key keypad is presented on a touch-sensitive display, such that each key includes a character and a shape. Embodiments of the present invention may represent the keypad as an image on a touch-sensitive screen, or may refer to a physical keypad with push buttons for key selection, referenced herein as "a/the keypad", for simplicity. In some embodiments, the character of a key may be positioned on the image of the key, and the key is presented as having a particular shape, such as a circle, square, triangle, octagon, or diamond, with the character encompassed in the shape. In other embodiments, the character may be adjacent to a key shape such that a selection includes both the character and the shape. For example, subsequent to receiving input initiating an authentication request, multi-attribute program 200 presents and activates keypad 115 on touch-sensitive display 110 to a requesting user. Keypad 115 includes multiple keys, including key 143 having a zero character and a diamond shape.

Having presented the keypad to the user, multi-attribute program 200 receives a selection of a first key-and-shape attribute (step 230). Multi-attribute program 200 receives the input of a user touching a particular key and shape combination from the keypad, and includes the selection as part of the authentication code sequence of the user. In some embodiments of the present invention, the user's touch selecting a key remains in contact with the touch-sensitive display. For example, the user selects a key having the character "zero" and a diamond shape, such as key 143. Multi-attribute program 200 receives the input of "Zero—diamond" as input to the user's authentication code, and the user remains in contact with key 143.

Continuing the example embodiment, the user maintains touch contact with the selected key and multi-attribute program 200 presents a color/pattern attribute selector image (step 240). In the embodiment, maintaining contact with the touch-sensitive screen may be an attribute associated with the key and shape selection. Multi-attribute program 200 determines that the user has maintained contact with a key-shape combination of the keypad, and in response displays a color selector image. In some embodiments, the user removes contact with the key as an alternative attribute and re-initiates contact with the appropriate color/pattern of the color/patter attribute selector image. In other embodiments of the present invention, multi-attribute program 200 presents a pattern selector image, or in other embodiments, presents a combination of color and pattern selector image. In one embodiment, the user slides the touch contact point from the selected key to a color or pattern section of the selector image corresponding to the user's authentication code, while maintaining contact with the touch-sensitive display. For example, the user selects key 143, "zero-diamond", from the keypad and maintains contact with key 143. Multi-attribute program 200 presents color selector 120 on touch-sensitive display 110, and the user slides the touch contact point from key 143 to red color section 125 while maintaining contact with touch-sensitive display 110.

Multi-attribute program 200 receives a color selection (step 250). In an example embodiment, the user maintains touch contact on a particular section of the color selector image, and multi-attribute program 200 determines the particular color corresponding to the point of touch contact. Multi-attribute program 200 receives and includes the color selection as part of the user's authorization code. In some embodiments of the present invention, the selection corresponds to a particular pattern section of the selector image rather than a color selection. In other embodiment, the selection corresponds to a combination of a color and a pattern, such as a red checkerboard pattern section of the selector image. For example, the user slides the touch contact point to red color section 125 of color selector 120 and maintains the touch contact and position. Multi-attribute program 200 receives the color corresponding to the position of the touch contact relative to the section of color selector 120 (red color section 125) and includes the color as part of the sequence of attributes of the user's authentication code. In yet other embodiments, the user may slide the touch contact point from the selected key-shape combination to an alternate position, such as alternate touch position 130, indicating no selection of color, but maintaining touch contact with touch-sensitive display 110. In still other embodiments, the user may remove the touch contact point from the selected key to indicate no color selection is being made, and replace the touch contact point at a designated position on the touch-sensitive display to initiate and receive non-visually detected attributes, also referred to as non-observable attributes, such as the haptic and auditory signal attributes.

Having made a color selection, the user establishes contact with the selected color section of the color selector image, and multi-attribute program 200 presents non-observable attributes (step 260). In some embodiments of the present invention, the user maintains touch contact with a selected color section of the color selector image, such as red color section 125, and multi-attribute program 200 generates a combination of haptic signals and auditory signals, which are not readily visible by an observing bystander or observation equipment. In other embodiments, the user re-establishes touch contact with the image of the selected color section of color selector 120. The user senses through the touch contact point whether a haptic signal is delivered, while a series of auditory sounds are presented. In some embodiments, the series of auditory sounds are presented with the haptic signal absent or present, and then the auditory sounds are repeated with the alternate state of the haptic signal absent or present. In other embodiments, the combination of haptic signal and auditory sounds are randomly presented to the user. In still other embodiments, as an alternative to a series of auditory sounds, a series of images are presented to the user in combination with the absence or presence of the haptic signal. In yet other embodiments, the user has maintained touch contact with alternate touch position 130, and receives haptic signals and auditory sounds in combination, sensing the presence or absence of haptic signals from touch contact with alternate touch position 130.

Having presented the non-observable attributes to the user, multi-attribute program 200 receives the selection(s) of the non-observable attributes from the user (step 270). In some embodiments of the present invention, multi-attribute program 200 receives a selection of a combination of haptic and auditory signals and includes the combination of attributes in the sequence of attributes comprising the user's authentication code. For example, the user selects a combination of haptic signal "on" and "bell ding" auditory signals, by removing their touch contact point subsequent to detection of the combination. In this example, the user's sequence of authentication may be (so far) Zero—Diamond—Red—Haptic On—Bell Ding.

In some embodiments of the present invention, multi-attribute program 200 also includes a combination of a backlit keypad and haptic signal as a non-observable attribute. The user applies a touch contact to the keypad and removes the touch contact subsequent to detecting an appropriate combination of haptic signal and backlighting of the keypad that corresponds to the authentication code of the user. For example, the user applies a touch contact to the keypad and determines a backlit or dark keypad in combination with a haptic signal on or off. The user removes the touch contact such that it corresponds to the detection of the appropriate combination. The combination is included in the user's authentication code sequence, for example: Zero—Diamond—Red—Haptic On+Bell Ding—Backlit keypad+Haptic Off.

Having received the selection of non-observable attributes, multi-attribute program 200 determines whether there are additional non-observable attributes to present (decision step 280). For the case in which multi-attribute program 200 determines no additional non-observable attributes are to be presented (step 280, "NO" branch), multi-attribute program 200 proceeds to determine whether additional key selections are required by the user's authentication code (step 290). In some embodiments of the present invention, multi-attribute program 200 tracks the user selections towards a sequence of attributes that correspond to the user's authentication code and determines whether all non-observable attributes of the selected object (key & shape) of the keypad have been presented to the user. Having presented all the non-observable attributes, multi-attribute program 200 proceeds to decision step 290 to determine if additional key selections are associated with the user's authentication code.

For the case in which multi-attribute program 200 determines there are additional non-observable attributes to present to the user (step 280, "YES" branch), multi-attribute program 200 proceeds to step 260 and presents additional non-observable attribute(s). In some embodiments of the present invention, the additional non-observable attributes may be an additional haptic or an additional auditory signal, or an additional combination of haptic and auditory signal. In other embodiments, the non-observable attribute may be, or include a temporal action performed by the user. In other embodiments, other attributes may be included in the authentication code sequence, individually or in combination. For example, the user may be required to verbally respond to a question or recite a phrase and multi-attribute program 200 performs speech recognition to confirm the recitation. In other embodiments, the user repeats an auditory phrase, with multi-attribute program 200 receiving the user's verbal response and performing voice recognition of the user. In still other embodiments, multi-attribute program 200 can present the user with images or video and provide a response, such as a touch contact of an image or part of an image, or perform a verbal response. Multi-attribute program 200 presents the non-observable attribute(s) at step 260 and proceeds as described above.

In some embodiments, multi-attribute program 200 may track the user's input towards recognition of the user's authentication code and determine whether additional key selection is expected. In other embodiments, additional key selection is expected by multi-attribute program 200 until the user indicates selections are complete, such as selection of an "enter" key, (not shown), or other indication action by the user, for example, as multiple touch contact taps on the touch-sensitive display, or by a no-input waiting period. For the case in which multi-attribute program 200 determines that more key selections are not made (step 290, "NO" branch), multi-attribute program 200 proceeds to perform authentication validation (step 295), and ends. For the case in which multi-attribute program 200 determines that more key selections are made (step 290, "YES" branch), multi-attribute program 200 proceeds to step 230 and receives a selection of a key & shape attribute from the keypad, and proceeds as discussed above with regard to step 230. In some embodiments of the present invention, multi-attribute program 200 presents consecutive instances of the set of attributes associated with the selected key and may present consecutive (i.e., more than one) instances of the one or more additional sets of attributes as selection options of the user's authentication code. The user may make sequential selections from the consecutive presentation of the set of attributes, and/or make sequential selections from the consecutive presentation of the one or more additional attributes.

Multi-attribute program 200 determines whether more key selections are made by the user (decision step 290). In some embodiments of the present invention, multi-attribute program 200 determines whether the user makes another key selection from the keypad. Each selection from the keypad is considered an object that has one or more attributes associated with the object selection. For example, the selection of a key from the keypad includes a character, such as the number zero, a shape associated with the selected key, such as a diamond shape, and subsequently may have attributes of color (or no color), haptic signal (or no haptic signal), auditory signal, (or no auditory signal), backlit keypad (or dark keypad), haptic signal with keypad backlit or dark, (or no haptic signal with keypad backlit or dark), and may have additional attributes, such as repeated attribute selections and temporal attributes.

In some embodiments of the present invention, multi-attribute program 200 receives a request for user authentication and determines a validity of the detected user selections with respect to the authentication code of the user (step 295). In some embodiments, multi-attribute program 200 determines whether the selections received from the user match the user's authentication code. In some embodiments, the selections and sequence are considered in validating the user's received input against the user's authentication code, with non-required entries ignored by multi-attribute program 200, such as a case in which the key number is required, but the accompanying shape is not included in the authentication sequence. In some embodiments, multi-attribute program 200 anticipates a particular number of selection types and combinations, such as a particular number of key-shapes selected and/or a particular number of haptic-audio selections, for example, and subsequent to receiving the anticipated number of selection types and combinations, determines whether the received input is valid against the user's authentication code on record (in storage). In other embodiments, multi-attribute program 200 receives selections by the user until entry is complete, and subsequently determines authentication. In other embodiments, as an inaccurate entry is detected by multi-attribute program 200, and an authentication failure is indicated to the user. In yet other embodiments, completion of selection entry is indicated by the user, such as touching or depressing an "enter" button or image (not shown). In some embodiments, multi-attribute program 200 notifies the user of authentication failure, and may allow a specified number of additional attempts to authenticate.

As a further example of one embodiment of the present invention, a user indicates a request for authentication at an ATM machine by scanning a membership card. The user's card is recognized and a horizontally mounted touch-sensitive display screen is activated and displays an image of a keypad with various shaped keys and various characters encircled within the shapes of the keys. The user selects a key that includes the character "0" (zero) and the hexagon shape. The user maintains contact with the key and the touch-sensitive display screen displays a color selector image that includes multiple colors, each color contained within a defined portion of the color selector image, and each portion including a text label of the color within the portion. The user slides their contact from the "zero-hexagon" key to the color "blue" on the color selector, and maintains contact with the blue color portion of the color selector image.

The color selector is activated to produce a haptic signal of one vibration then a pause, then two short vibrations and then a pause, then three short vibrations, in combination with presenting an audible sound of a bell ringing. The next sequence repeats the various vibrations and pauses in combination with a barking dog sound, followed by a sequence repeating the various vibrations in combination with a car horn sound. The user, maintaining contact with the color selector, removes contact in response to the combination of two short vibrations in combination with the barking dog sound. This indicates the user's selection of the combination, which is added to the previous user selections resulting in the authentication sequence of: "zero—hexagon, blue, two vibrations+barking dog sound."

In response to the user's selection of the two haptic vibrations and barking dog sound combination, the touch-sensitive screen display activates the image of the keypad indicating an alternating sequence of a backlit keypad to a dark background keypad. In combination, the touch-sensitive screen display is enabled to generate a haptic vibration followed by an absence of the haptic vibration for each instance of backlit keypad and dark background keypad. The user makes contact with the keypad image and removes contact in response to detecting a combination of backlighting or dark keypad, and vibrating or absence of vibration haptic signal. The user removes contact in response to a backlit keypad with a haptic vibration signal, which is input as part of the user's authentication code. The user's sequence selected thus far is "zero—hexagon, blue, two vibrations+barking dog sound, backlit keypad+vibration". The touch sensitive screen display indicates an active keypad to begin another key selection opportunity for the user. The user in this example has completed entry of the user's authentication code, and indicates completion by pressing an "enter" button, and the system determines whether the received input is authenticated against the stored authentication code of the user.

Figure 3:
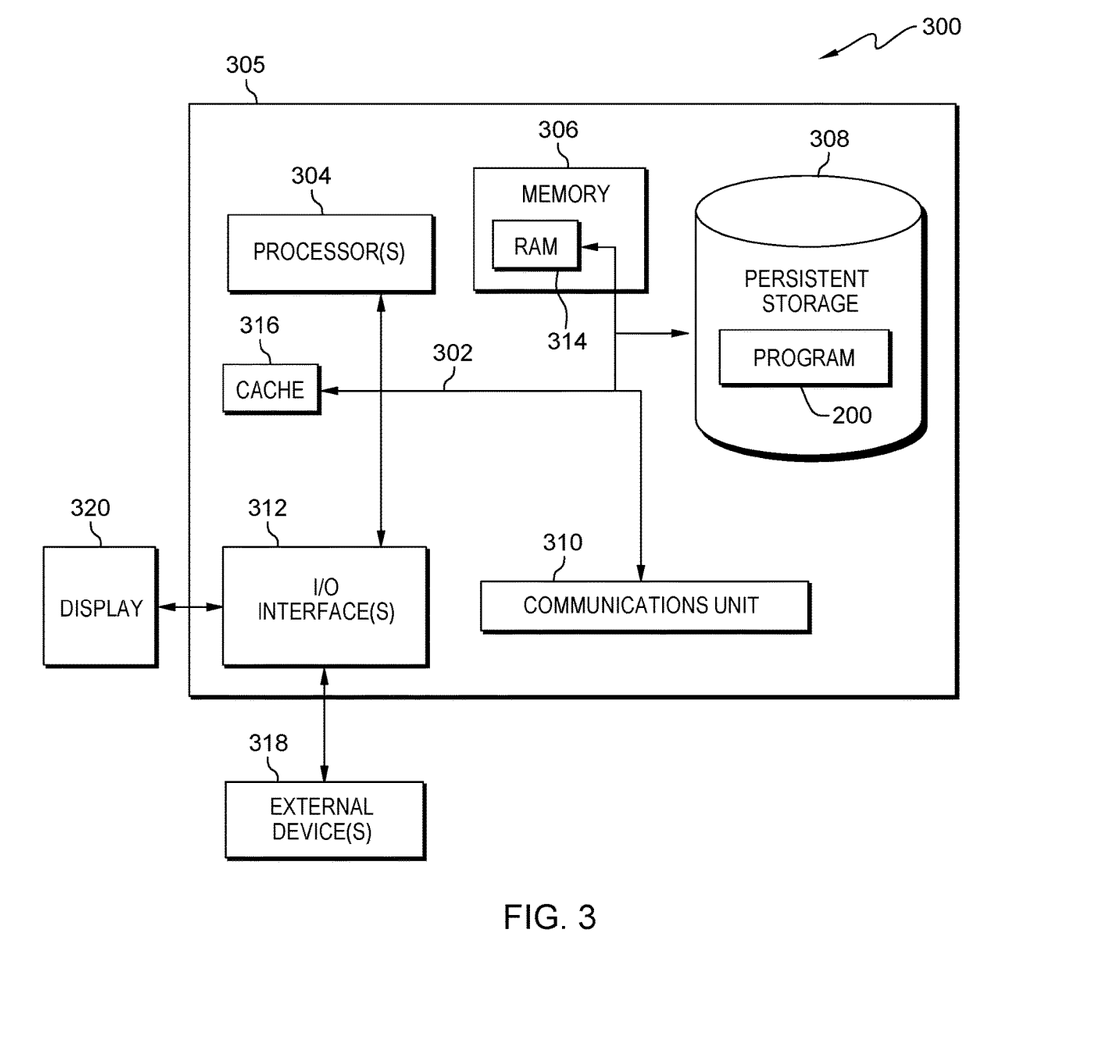
FIG. 3 depicts a block diagram of components of a computer system including a computing device capable of operationally performing the multi-attribute program, in accordance with an embodiment of the present invention.

FIG. 3 depicts a block diagram of components of system 300, which includes computing device 305. Computing device 305 includes components and functional capability similar to computing device 160 (FIG. 1), in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 305 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306, cache memory 316, and persistent storage 308 are computer readable storage media. In this embodiment, memory 306 includes random access memory (RAM) 314. In general, memory 306 can include any suitable volatile or non-volatile computer readable storage media.

Multi-attribute program 200 is stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of distributed data processing environment 100, such as touch-sensitive display 110, speaker 140, microphone 135 and haptic signal emitter 155. In these examples, communications unit 310 includes one or more network interface cards. Communications unit 310 may provide communications through the use of either or both physical and wireless communications links. Multi-attribute program 200 may be downloaded to persistent storage 308 through communications unit 310.

I/O interface(s) 312 allows for input and output of data with other devices that may be connected to computing system 300. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., multi-attribute program 200, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for receiving an authentication code, the method comprising:

one or more processors activating an image of a keypad presented to a user requesting entry of an authentication code of the user, such that the keypad includes multiple keys, each key including a character from a set of characters and each key assuming a shape from a set of shapes;

the one or more processors, responsive to detecting a selection of a key and shape combination from the keypad, activating a display of a selector image associated with the selection of the key and shape combination;

the one or more processors, receiving a selection from the display of the selector image, wherein the selection of the selector image comprises detecting a maintained contact of the selection with the selector image;

while the maintained contact of the selection with the selector image is detected, the one or more processors presenting a series of combinations of haptic signals with auditory signals, wherein a respective haptic signal is presented while a respective auditory signal is presented in combination;

the one or more processors detecting a release of the maintained contact subsequent to the user recognizing a particular haptic signal while a particular auditory signal is presented in combination, which is associated with the authentication code of the user, from the presented series of combinations of haptic signals with auditory signals;

the one or more processors detecting a reestablished maintained contact with the display of the selector image subsequent to the release of the maintained contact;

responsive to detecting the reestablished maintained contact, the one or more processors presenting a series of sequences of a backlighted keypad to a dark keypad with haptic signals, wherein a respective backlighted keypad or a respective dark keypad is presented while a respective haptic signal is presented in combination, wherein the dark keypad is the absence of the backlighted keypad;

the one or more processors detecting a release of the reestablished maintained contact subsequent to the user recognizing a particular backlighted keypad or a particular dark keypad while a particular haptic signal is presented in combination, which is further associated with the authentication code of the user, from the presented series of sequences of the backlighted keypad to the dark keypad with haptic signals;

the one or more processors, responsive to detecting the release of the reestablished maintained contact, activating one or more additional sets of attributes, wherein the one or more additional sets of attributes includes a non-visually observable attribute, wherein the non-visually observable attribute includes receiving a vocal response by the user in response to a question presented to the user;

the one or more processors, responsive to receiving a request for user authentication, determining a validity of detected user selections from the selection of the key and shape combination, the selection from the selector image, the particular haptic signal with the particular auditory signal recognized while the maintained contact is detected, and the particular backlighted keypad or the particular dark keypad with the particular haptic signal recognized while the reestablished maintained contact is detected, and the vocal response with respect to the authentication code of the user; and the one or more processors, responsive to determining the validity of the detected user selections and the vocal response, authenticating the user.

2. The method of claim 1, wherein detecting the selection of the key and shape combination from the keypad includes detecting a touch contact with a touch-sensitive display that includes the image of the keypad including the multiple keys and includes a temporal attribute requiring a minimum delay between a first selection and a subsequent selection.

3. The method of claim 1, the receiving a selection from the display of the selector image further comprising: the one or more processors detecting a sliding touch contact by the user from the selection of the key and shape combination to a position on the selector image corresponding to an omission of attributes displayed on the selector image.

4. The method of claim 3, wherein the selector image is a color selector image.

5. The method of claim 1, wherein the one or more additional sets of attributes further includes combinations of a vibration haptic signal and an auditory signal.

6. The method of claim 1, wherein the one or more additional sets of attributes further includes selection of combinations selected from a group consisting of: a color, a pattern, a haptic signal, an audio signal, backlighting of the keypad, an image, a video, and a temporal response.

7. The method of claim 1, wherein the detecting of the selection of the key and shape combination of the keypad includes the one or more processors presenting consecutive instances of the selector image and the one or more additional sets of attributes as selection options of the authentication code of the user.

8. The method of claim 1, wherein the detecting of the selection of the key and shape combination from the keypad, a selection of an attribute selected by the user from the selector image, and the one or more additional attributes selected by the user corresponding respectively to the one or more additional sets of attributes are detected by input from a pointing device.

9. The method of claim 1, wherein a selection of an attribute from the selector image, and selection of an additional attribute corresponding to the one or more additional sets of attributes, which are not found in the authentication code of the user, are ignored in validation of the authentication code.

10. A computer program product for receiving an authentication code, the computer program product comprising:

one or more computer readable storage media and program instructions stored on the one or more computer readable storage media, the program instructions comprising:

program instructions to activate an image of a keypad presented to a user requesting entry of an authentication code of the user, such that the keypad includes multiple keys, each key including a character from a set of characters and each key assuming a shape from a set of shapes;

responsive to detecting a selection of a key and shape combination from the keypad, program instructions to activate a display of a selector image associated with the selection of the key and shape combination;

program instructions to receive a selection from the display of the selector image, wherein the selection of the selector image comprises detecting a maintained contact of the selection with the selector image;

while the maintained contact of the selection with the selector image is detected, program instructions to present to the user a series of combinations of haptic signals with auditory signals, wherein a respective haptic signal is presented while a respective auditory signal is presented in combination;

program instructions to detect a release of the maintained contact subsequent to the user recognizing a particular haptic signal while a particular auditory signal is presented in combination, which is associated with the authentication code of the user, from the presented series of combinations of haptic signals with auditory signals;

program instructions to detect a reestablished maintained contact with the display of the selector image subsequent to the release of the maintained contact;

responsive to detecting the reestablished maintained contact, program instructions to present a series of sequences of a backlighted keypad to a dark keypad with haptic signals, wherein a respective backlighted keypad or a respective dark keypad is presented while a respective haptic signal is presented in combination, wherein the dark keypad is the absence of the backlighted keypad;

program instructions to detect a release of the reestablished maintained contact subsequent to the user recognizing a particular backlighted keypad or a particular dark keypad while a particular haptic signal is presented in combination, which is further associated with the authentication code of the user, from the presented series of sequences of the backlighted keypad to the dark keypad with haptic signals;

responsive to detecting the release of the reestablished maintained contact, program instructions to activate one or more additional sets of attributes, wherein the one or more additional sets of attributes includes a non-visually observable attribute, wherein the non-visually observable attribute includes receiving a vocal response by the user to a question presented to the user;

program instructions to receive a request for user authentication, determining a validity of detected user selections from the selection of the key and shape combination, the selection from the selector image, the particular haptic signal with the particular auditory signal recognized while the maintained contact is detected, and the particular backlighted keypad or the particular dark keypad with the particular haptic signal recognized while the reestablished maintained contact is detected, and the vocal response with respect to the authentication code of the user; and responsive to determining the validity of the detected user selections and the vocal response, program instructions to authenticate the user.

11. The computer program product of claim 10, wherein the selection of the key and shape combination from the keypad includes program instructions to detect a user making a touch contact with a touch-sensitive display that includes the image of a keypad including multiple keys and includes a temporal attribute requiring a minimum delay between a first selection and a subsequent selection.

12. The computer program product of claim 10, the program instructions to receive a selection from the display of the selector image further comprising: program instructions to detect a sliding touch contact by the user from the selection of the key and shape combination to a position on the selector image corresponding to an omission of attributes displayed on the selector image.

13. The computer program product of claim 10, wherein selection of attributes of the one or more additional sets of attributes includes one or a combination selected from a group consisting of: backlighting of the keypad, a dark keypad indicating an absence of backlighting, a haptic signal associated with the keypad, and an absence of a haptic signal associated with the keypad.

14. A computer system for inputting an authentication code, the computer system comprising:
one or more computer processors;
one or more computer readable storage media; and
program instructions stored on the one or more computer readable storage media for execution by at least one of the one or more computer processors, the program instructions comprising:
program instructions to activate a keypad to a user requesting entry of an authentication code of the user, such that the keypad includes multiple keys, each key including a character from a set of characters and each key assuming a shape from a set of shapes;
responsive to detecting a selection of a key and shape combination from the keypad, program instructions to activate a display of a selector image;
program instructions to receive a selection from the display of the selector image, wherein the selection of the selector image comprises detecting a maintained contact of the selection with the selector image;
while the maintained contact of the selection with the selector image is detected, program instructions to present to the user a series of combinations of haptic signals with auditory signals, wherein a respective haptic signal is presented while a respective auditory signal is presented in combination;
program instructions to detect a release of the maintained contact subsequent to the user recognizing from the presented series of combinations, a particular haptic signal while a particular auditory signal is presented in combination, which is associated with the authentication code of the user, from the presented series of combinations of haptic signals with auditory signals;
program instructions to detect a reestablished maintained contact with the display of the selector image subsequent to the release of the maintained contact;
responsive to detecting the reestablished maintained contact, program instructions to present a series of sequences of a backlighted keypad to a dark keypad with haptic signals, wherein a respective backlighted keypad or a respective dark keypad is presented while a respective haptic signal is presented in combination, wherein the dark keypad is the absence of the backlighted keypad;
program instructions to detect a release of the reestablished maintained contact subsequent to the user recognizing a particular backlighted keypad or a particular dark keypad while a particular haptic signal is presented in combination, which is further associated with the authentication code of the user, from the presented series of sequences of the backlighted keypad to the dark keypad with haptic signals;

responsive to detecting the release of the reestablished maintained contact, program instructions to activate one or more additional sets of attributes, wherein the one or more additional sets of attributes includes a non-visually observable attribute, wherein the non-visually observable attribute includes receiving a vocal response by the user in response to a question presented to the user;

responsive to receive a request for user authentication, program instructions to determine a validity of detected user selections from the selection of the key and shape combination, the selection from the selector image, the particular haptic signal with the particular auditory signal recognized while the maintained contact is detected, and the particular backlighted keypad or the particular dark keypad with the particular haptic signal recognized while the reestablished maintained contact is detected, and the vocal response with respect to the authentication code of the user; and responsive to determining the validity of the detected user selections and the vocal response, program instructions to authenticate the user.

15. The computer system of claim 14, wherein detection of the selection of the key and shape combination from the keypad initiates program instruction to detect a user making a touch contact with a touch-sensitive display that includes the image of a keypad including multiple keys and includes a temporal attribute requiring a minimum delay between a first selection and a subsequent selection.

16. The computer system of claim 14, the program instructions to receive a selection from the display of the selector image further comprising: program instructions to detect a sliding touch contact from the selection of the key and shape combination to a position on the selector image corresponding to an omission of an attribute of the selector image.

17. The computer system of claim 14, wherein the one or more additional attributes includes a combination selected from a group consisting of: a haptic signal, an auditory signal, and backlighting of the keypad.

18. The computer system of claim 14, wherein the detection of the selection of the key and shape combination of the keypad includes program instructions to present consecutive instances of the selector image and the one or more additional sets of attributes as selection options of the authentication code of the user.

19. The computer system of claim 14, wherein the selector image and the one or more additional sets of attributes includes selection and omission options of one or combinations from a group consisting of: a color, of a pattern, haptic signals, audio signals, a vocal response, and a temporal response.

* * * * *